UNITED STATES PATENT OFFICE.

FRANCIS X. BYERLEY, OF CLEVELAND, OHIO.

IMPROVEMENT IN PROCESSES OF PURIFYING PARAFFINE WAX.

Specification forming part of Letters Patent No. 132,353, dated October 22, 1872; reissue No. 7,559, dated March 20, 1877; application filed February 16, 1877.

*To all whom it may concern:*

Be it known that I, FRANCIS X. BYERLEY, of Cleveland, in the county of Cuyahoga and State of Ohio, have invented a certain new and Improved Process of Purifying Paraffine Wax, of which the following is a specification:

The nature of this invention relates to a process for separating paraffine from oil and refining the same; and it consists in placing the chilled oil containing the paraffine broken into fragments in a receiver or receptacle provided with a straining bottom, and connected with a pump.

The tendency of the oil to separate from the paraffine is increased by the action of the pump, and the time occupied in the separation is thus very much shortened. The oil as it separates from the paraffine passes through the strainer, and is delivered into a proper receptacle, the paraffine still mixed with some oil which the pump has not removed remaining above the strainer. In order to remove this remainder of oil which is combined with the paraffine, or to "refine" the wax, as it is called, naphtha, gasoline, or other equivalent solvent is sprinkled on the surface of the mass, remaining on the strainer. This, combining with the oil, is carried through the strainer, and delivered to a receptacle, the paraffine or refined wax remaining above the strainer as before.

Take the paraffinized oil, which has been chilled in the usual manner—if it is in a solid mass it should be broken up into fragments by any suitable means—and place it in an open vessel with a perforated false bottom. This false bottom should be covered with canvas or other suitable straining medium, and closely fitted to the sides of the vessel at a short distance from the main bottom.

Should it be desired to preserve the temperature of the chilled mass during the process, this vessel or receptacle should be surrounded by a larger one, and the space between them filled with a cooling-mixture.

The vessel containing the chilled mass of paraffinized oil is connected below the false bottom with a pump or other contrivance for drawing off the oil as it drains away from the mass. After the chilled oil has been placed in the vessel aforesaid, the pump is set in motion, and the oil is thus carried off, leaving the paraffine wax in its crude state above the false bottom, in which state it may be considered as the ordinary crude wax of commerce.

The next step is to refine this wax, and to do it naphtha, gasoline, or any other solvent of paraffine, or the oil, is sprinkled over it. The pump being kept constantly in motion, the solvent and the parts dissolved are thus carried off, the action of the pump accelerating the filtration.

The sprinkling and pumping is continued until the paraffine has been refined to the desired point.

Should the object be to refine crude paraffine obtained in any other manner, the paraffine should first be grained in the usual way, and then placed in the vessel with the false bottom, and treated as above described, with the solvent, and subjected to the action of the mechanism referred to.

This process may be applied to all analogous substances, such as lard, stearine, &c., with like results, and is a very quick and efficient process.

I am aware that an exhaust-pump in connection with a filter has been used for the purpose of separating water from paper pulp, and in sugar and oil filtration; also, in separating sirup from crystallized sugar. Furthermore, I am aware that a vacuum has heretofore been used to effect the separation of the oil from paraffine wax; but in such latter processes the vacuum has been established but once, or at intervals, thus interfering with the success of the operation. In this process the exhausting or suction action is sustained throughout the operation and made continuous, thereby insuring a rapid and satisfactory separation.

What I claim as my invention, and desire to secure by Letters Patent, is—

1. The process of separating paraffine wax from the oil, which consists in removing the latter from a chilled mass of the paraffinized material by a continuous direct exhaust or suction action, as herein set forth.

2. The process of purifying paraffine wax, which consists in dissolving out the contained oil by passing naphtha or other solvent through the chilled mass, and promoting its passage by an exhaust or sucking action, as herein set forth.

3. The process of preparing refined paraffine wax, which consists in removing the principal portion of the oil contained in the chilled paraffinized mass by a continuous direct exhaust or suction action, and then completing the separation by passing naphtha or other solvent through it, and at the same time continuing the exhaust, as herein set forth.

FRANCIS X. BYERLEY.

Witnesses:
J. H. BURRIDGE,
W. H. BURRIDGE.